United States Patent [19]
Permut et al.

[11] 3,874,475

[45] Apr. 1, 1975

[54] VEHICLE CLOSING SPEED LIMITER AND PERFORMANCE MONITORING SYSTEMS

[76] Inventors: Albert A. Permut; Ronald M. Permut; Alan R. Permut, all of 6995 Sweetwater Ct., Boulder, Colo. 80301

[22] Filed: July 23, 1973

[21] Appl. No.: 382,076

Related U.S. Application Data
[63] Continuation of Ser. No. 143,079, May 13, 1971, Pat. No. 3,763,954.

[52] U.S. Cl. .............................. 180/98, 180/105 E
[51] Int. Cl. ............................................ B60k 31/00
[58] Field of Search ......... 180/98, 105 E; 340/31 R, 340/33, 53, 32; 317/5; 246/187 C

[56] References Cited
UNITED STATES PATENTS

| | | | |
|---|---|---|---|
| 2,933,726 | 4/1960 | Campbell et al. | 180/98 X |
| 2,996,137 | 8/1961 | Chu et al. | 180/98 |
| 3,235,025 | 2/1966 | Quinn | 340/33 X |
| 3,270,199 | 8/1966 | Smith | 180/98 X |
| 3,378,102 | 4/1968 | Collin et al. | 180/98 |
| 3,476,204 | 11/1969 | Westby et al. | 180/98 |
| 3,570,622 | 3/1971 | Wisner | 180/105 E |
| 3,689,882 | 9/1972 | Dessailly | 180/98 |
| 3,763,954 | 10/1973 | Permut et al. | 180/98 |

*Primary Examiner*—Kenneth H. Betts

[57] ABSTRACT

A vehicle closing speed limiter and performance monitoring system is disclosed which generates a first train of pulses at a frequency directly related to vehicle actual speed. Also, a signal is transmitted from a preceding vehicle, representing said preceding actual vehicle speed, to an on-following vehicle when the two vehicles are traveling in the same direction and substantially in the same lane of traffic. The on-following vehicle, which receives the transmitted signal, compares the preceding vehicle speed frequency with its own speed frequency. When the on-following vehicle speed exceeds the speed of the preceding vehicle, the on-following vehicle is slowed by a generated first force proportional to the thus determined closing speed, said first force being applied to the on-following vehicle's throttle mechanism in opposition to the force of pressure applied by the vehicle operator's foot, thereby reducing the closing speed to zero.

Also disclosed is a means for measuring the deviation of vehicle steering angle with time, such that when the time integral of the steering deviation exceeds a predetermined value, the vehicle is slowed to a speed corresponding to engine idle speed by automatically disconnecting the accelerator foot pedal from the vehicle's throttle mechanism. This embodiment of the invention prevents the vehicle operator from operating the vehicle at normal speeds when said operator is intoxicated, ill, or inhibited by vehicle malfunction.

And further disclosed is means for recording the various speed and steering deviation parameters on an endless magnetic recording device to establish a limited time history of the vehicle performance.

9 Claims, 10 Drawing Figures

VEHICLE CLOSING SPEED LIMITER AND PERFORMANCE MONITORING SYSTEMS

ORIGIN OF INVENTION

The invention described herein is a continuation in part of pending application Ser. No. 143,079 filed May 13, 1971 now U.S. Pat. No. 3,763,954, and presents additional utility of existing functions and generated signals described and claimed in subject application, as well as presenting new matter which is a logical outgrowth of subject application.

BACKGROUND OF THE INVENTION

1. Field of the Invention

The present invention generally relates to speed control devices and, more particularly, to a system for controlling the closing speed between two vehicles, one following the other, on freeways and the like; and vehicle speed and driving performance monitoring and recording.

2. Description of the Prior Art

In the past various systems and devices have been proposed for the control of vehicle closing speed. The basic principles underlying such systems or devices utilize radar signals involving either controlled reflection of subject signals or the utilization of transponder signals and/or the utilization of the Doppler frequency shift. Such systems suffer from several significant disadvantages. First, both the radar and Doppler systems require separate equipments to satisfy the requirement whereas in the present invention this capability can be derived from the basic system which also provides maximum speed control, cruise control and other functions as described in the previously recited pending application. Secondly, both the radar and Doppler systems are subject to the undesirable effects of extraneous and random signal reflections from other than the concerned vehicles, such as from concrete embankments, road signs or vehicles traveling in the opposite direction from that of the vehicles concerned. Thirdly, the character and signal strength of both the radar and Doppler signals are significantly more complex and of higher power than that required by the disclosed invention.

These disadvantages greatly limit the practical, economical and reliable use of prior-suggested systems. A need therefore exists for a new vehicle closing speed limiter and performance monitoring system.

OBJECTS AND SUMMARY OF THE INVENTION

It is the primary object of the present invention to provide a new improved vehicle closing speed limiter and performance monitoring system in which a first train of pulses, at a frequency directly related to actual vehicle speed, is generated. Also, a coded signal derived from said first train of pulses is generated and transmitted from each vehicle in a rearward direction with limited radiation beam width and limited propogational range. Said transmitted signal being directly related to the actual vehicle speed and direction of travel of said vehicle.

Said transmitted signal is receivable by any on-following vehicle moving in the same direction and substantially in the same lane of traffic, and being within the zone of influence of the preceding vehicle signal transmission.

The signal thus received from the preceding vehicle, and which represents the actual speed and direction of said preceding vehicle, is compared to the actual speed of the on-following vehicle such that a speed differential between the two vehicles is determined, which is the rate of closing speed between the two vehicles, one preceding the other, traveling in the same direction and substantially in the same lane of traffic.

When the thus determined closing speed exceeds a predetermined value within a predetermined separation distance between said vehicle, an output voltage is generated which in turn generates a first force proportional to the closing speed of said vehicles. Said first force is spplied to the on-following vehicles throttle mechanism in opposition to the force or pressure normally applied by the vehicle operators foot, thereby slowing or reducing the speed of the on-following vehicle such that the closing speed is reduced to zero. This action of the applied force makes the vehicle operator aware of the closing speed situation.

However, if the operator of the on-following vehicle choses to pass the preceding vehicle, it is only necessary to over-ride the restraining force applied to the throttle mechanism, i.e., turn out of the traffic lane and accelerate the vehicle in order to pass in the conventional manner.

Another object of the present invention is to provide a vehicle control system which automatically slows the vehicle to a predetermined slow speed in the event the vehicle operator is unable to maintain acceptable steering control of the vehicle, either due to intoxication, illness, or vehicle malfunction. Said system consisting of a multi-turn potentiometer or similar sensor attached to the steering column or other suitable vehicle steering location which generates an output whose amplitude and rate of change are a function of the vehicle steering angle deviation from the straightaway. When the time integral of said output exceeds a predetermined value, the vehicle's throttle mechanism is automatically disengaged.

A further object of the invention is the provision of a vehicle closing speed limiter and performance monitoring system which records on an endless magnetic recording device a continuous but limited time history of actual vehicle speed, maximum commanded speed, closing speed and the deviation of steering angle.

Another object of the present invention is to provide a new vehicle closing speed limiter and performance monitoring system which operates essentially in the digital domain and which is substantially uneffected by amplitude variation and noise conditions for signals transmitted to and between vehicles, as well as being uneffected by signals reflected from other dense objects or other vehicles traveling in other than the appropriate direction or lane of traffic.

A further object of the present invention is to provide a vehicle control system which is adapted for use on all types of traffic conditions, such as city streets, freeways and interurban highways and which is capable of controlling the closing speeds of vehicles in each of two directions at the same time.

And yet another object of the present invention is to provide a vehicle closing speed limiter and performance monitoring system which is complementary to and compatible with the system described in Application Ser. No. 143,709, Filing Date May 13, 1971 now U.S. Pat. No. 3,763,954 and which in no way alters, or interfers with the maximum speed control or other cruise control functions or capabilities of said system.

The novel features of this invention are set forth with particularity in the appended claims. The invention will best be understood from the following description when read in conjunction with the accompanying drawings.

DESCRIPTION OF THE PREFERRED EMBODIMENTS

For purposes of clarity and to distinguish between that which is claimed in Application Ser. No. 143,079, Filed May 13, 1971, herein after referred to as the invention and matter that is new herein after referred to as the present invention, references to FIGS. 1 thru 9 will show capital letters following the reference numerals as representing those features which are germain to the present invention. It should be apparent, however, to those skilled in the art that the functional aspects of the various circuits are either identical or similar in both.

In addition, for futher purposes of clarity, regarding the closing speed limiter, the vehicles concerned with a closing speed situation involving two vehicles traveling in the same direction and substantially in the same lane of traffic will hereinafter be referred to as the "preceding vehicle" as describing the vehicle in front; and the "on-following vehicle" as describing the vehicle to the rear and which is the vehicle closing on the vehicle in front as a result of a speed differential, such that $V_{of} > V_p$ where $V_{of}$ represents the actual speed of the on-following vehicle and $V_p$ represents the actual speed of the preceding vehicle.

In turn, $f_{of}$ represents the speed frequency of the on-following vehicle and $f_p$ represents the speed frequency of the preceding vehicle.

It should also be apparent to those skilled in the art that the vehicle which transmits its own speed signals to other vehicles is in fact the preceding vehicle, and in all cases $f_v = f_p$. However, and also, $f_v = f_{of}$ for the on-following vehicle. In other words, $f_v$, $f_p$, and $f_{of}$ in all cases represent own speed for each vehicle.

Figure 1:
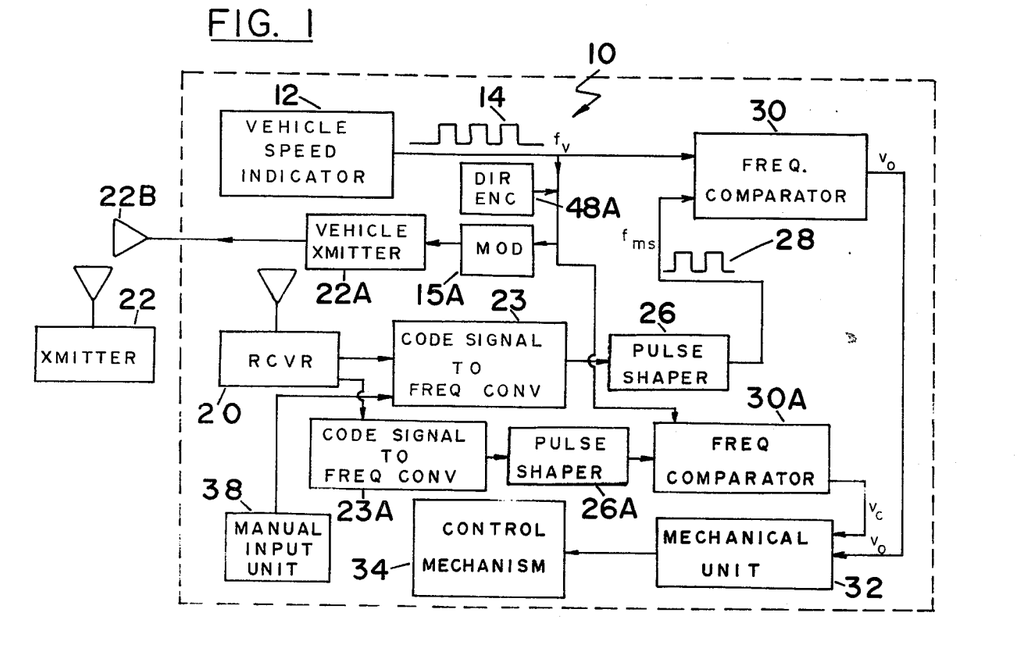
FIG. 1 is a block diagram of one embodiment of the invention.

Referring to FIG. 1, reference numeral 10 designates the system of the invention which is diagrammed in block form. It includes a vehicle speed indicator 12 whose output is a train of pulses, such as squarewave pulses 14, produced at a frequency which is directly related to actual vehicle speed. This frequency will be referred to hereafter as the vehicle speed frequency and will be designated $f_v$.

Also included in the system 10 is a receiver 20 which is assumed to receive a carrier-modulated coded signal from a remotely located transmitter 22, said signal representing the maximum commanded speed frequency $f_{ms}$.

Transmitter 22A which is located in each vehicle and system 10 such that its signal representing the vehicles own speed and direction, it transmitted in the rearward direction with predetermined and limited narrow beam width and operational range. The actual vehicle speed frequency $f_v = f_p$ is combined with the vehicle directional code by 48A and transmitted rearward as described by directional narrow beam antenna 22B.

After carrier demodulation of both $V_{ms}$ and $V_p$, the extracted coded signals are supplied to code to frequency converters 23 and 23A. Briefly, therein the coded signals are decoded and the decoded signal $V_{ms}$ is used to activate a latchable variable frequency oscillator in converter 23, and decoded signal $V_p$ a straight forward variable frequency oscillator in converter 23A. The output frequencies of the oscillators are directly related to the characteristics or codes of the respective decoded signals. The converter 23 includes a latchable feature which enables the oscillator to supply a constant output frequency in response to the last received coded signal until a new coded signal is received. Thus, the input to converter 23 is a succession of discrete coded signals rather than a continuously supplied signal. The input to converter 23A, $V_p$, may be continuous or aperiodic, depending on whether or not the receiving on-following vehicle is within the zone of influence of the preceding vehicle transmission, this condition thus representing a closing speed situation.

In practice, each time a vehicle enters the transmission range of different transmitters, new coded signals, which may differ from previously received coded signals, are received. However, until the new coded maximum speed signal is received, the output frequency of the code signal to frequency converter 23 corresponds to the last received maximum speed coded signal; and the output frequency of code signal to frequency converter 23A corresponds to the actual speed of the preceding vehicle.

It should be now apparent to those skilled in the art that only in the case of the maximum speed signal is the latching or memory feature employed, whereas in the case of closing speed, no latching or memory is involved and the closing speed function is operative only when the on-following vehicle is in the zone of influence of the preceding vehicle transmission while both vehicles are traveling in the same direction and substantially in the same lane of traffic.

The output of converters 23 and 23A may be shaped by pulse shapers 26 and 26A whose output pulses have the same shape, such as squarewaves 28 and 28A, as the pulses from unit 12 and at a frequency identical with the output frequency of each respective oscillator. The codes of the coded signals which are transmitted by transmitters 22 and 22A and received by receiver 20 represent the desired maximum vehicle speed and the actual speed of the preceding vehicle whenever their respective criteria are satisfied. Since the output frequencies of shapers 26 and 26A are directly related to the respective codes of the coded signals, they will be referred to as the maximum speed frequency and the preceding vehicle speed frequency and will be designated by $f_{ms}$ and $f_p$ respectively. Also, $f_r$, the actual speed frequency of each vehicle may become $f_p$ or $f_{of}$ depending on whether the vehicle in question is preceding or on-following in the closing speed situation.

In accordance with the teachings of the invention, the two frequencies $f_r$ and $f_{ms}$ are compared in a frequency comparator 30 whose output is an analog signal, such as a voltage $V_o$, whose amplitude is related to the difference between $f_r$ and $f_{ms}$. $V_o$ is zero whenever $f_r \leq f_{ms}$ and is proportional to the difference $f_r - f_{ms}$ when $f_r > f_{ms}$. Thus, $$V_o = 0 \text{ when } f_r \leq f_{ms}$$
$$V_o = g(f_r - f_{ms}) \text{ when } f_r > f_{ms}.$$

Further, in accordance with the teachings of the present invention, the two frequencies $f_{of}$ and $f_p$ are compared in a frequency comparator 30A whose output is an analog signal, such as a voltage $V_c$, whose amplitude is related to the difference between $f_{of}$ and $f_p$. $V_c$ is zero whenever $f_{of} \leq f_p$ and is proportional to the difference $f_{of} - f_p$ when $f_{of} > f_p$. Thus, $$V_c = o \text{ when } f_p \geq f_{of}$$
$$V_c = g(f_{of} - f_p) \text{ when } f_{of} > f_p$$

It should be remembered that for each particular vehicle, depending on whether it is designated the on-following vehicle or preceding vehicle $f_{of} = f_r$ and/or $f_p = f_r$ respectively.

Voltages $V_o$ and $V_c$ are applied to a mechanical unit 32, such as a motor, whose function is to apply a force proportional to $V_c$ or $V_c$ which ever is greater, to the vehicle's throttle actuator mechanism, designated by numeral 34 and hereafter simply referred to as the throttle mechanism. The force which is applied to the throttle mechanism is a restraining force which is in opposition to the operator's foot pressure.

In operation, as long as the vehicle speed is not greater than the desired maximum speed, as defined by the code of the last received coded maximum speed signal, i.e., $f_r \leq f_{ms}$, $V_o$ is zero and no restraining force is applied to the throttle mechanism in opposition to the operator's foot pressure. However, as soon as the vehicle speed exceeds the maximum commanded speed, a restraining force in opposition to the operator's foot pressure is applied. Consequently, the vehicle operator becomes immediately aware of the excessive vehicle speed. The restraining force, whose magnitude is directly related to the difference between the vehicle actual speed and the maximum commanded speed, reduces to zero as soon as the vehicle speed is not greater than the maximum commanded speed, i.e., when $f_r \leq f_{ms}$.

Also, in operation, as long as the closing speed is zero between any two vehicles in a closing speed situation as defined previously, i.e., $f_{of} \leq f_p$, $V_c = 0$ and no restraining force is applied to the throttle mechanism in opposition to the vehicle operator's foot pressure. Also, as soon as the actual speed of the on-following vehicle exceeds the actual speed of the preceding vehicle when the former vehicle is in the zone of influence of the rearward transmitted speed signal, a restraining force in opposition to the operator's foot pressure is applied which immediately slows the on-following vehicle and immediately makes the vehicle operator aware of the undesirable speed closing situation. This restraining force, whose magnitude is directly related to the closing speed, or $f_{of} - f_p$, reduces to zero as soon as the closing speed is reduced to zero, i.e., when $f_{of} \leq f_p$, then $V_c = 0$.

As is appreciated in accordance with the teachings of the invention, each different code of the coded signals defines a different maximum speed. This speed may vary from zero miles per hour to a maximum of speed limit, e.g., seventy miles per hour. If desired, the maximum speed may be incremented in increments, e.g., 5 miles per hour. Thus, to vary the maximum speed from 0 to 70 mph in 5 mph increments, the receiver 20 and unit 23 have to be able to receive up to 15 different coded signals, decode them and activate the oscillator to provide any one of 15 frequencies.

As is also appreciated, in accordance with the teachings of the present invention, each directional code defines a specific direction such that only the previously defined on-following vehicles and the associated preceding vehicle speed signals are compared when these are within the transmitted signal influence zone with respect to the two vehicles concerned with closing speed limiter function; and all other vehicles are mutually excluded from the closing speed control function unless they too can satisfy the criteria previously established for the closing speed situation.

The closing speed may vary from zero miles per hour to say 50 miles per hour, in increments of 1 mile per hour, depending on the frequency chosen to represent vehicle speed and the desired accuracy of closing speed determination. As an example, a difference frequency of ten cycles per second could represent an actual speed difference or closing speed of 1 mile per hour.

As will be appreciated by those skilled in the art, the functions of maximum speed control, cruise control and closing speed control are mutually independent one from the other except as previously defined in the pending application; and may act either singly or in concert without conflict as driving conditions demand.

Since different vehicles have different wheels sizes and gear ratios, it is important that in each particular vehicle its $f_r$ for a particular speed corresponds to $f_{ms}$ provided by the oscillator when a coded signal corresponding to the particular speed is received. Since $f_r = f_p = f_{of}$ at all times depending on whether the vehicle in question is the preceding vehicle or on-following vehicle, the same is true with regard to wheel sizes and gear ratios and is accomplished in the case of the closing speed function. Upon installing the system 10, this may be accomplished by either adjusting the frequencies provided by $f_r$ as a function of vehicle actual speed, or by adjusting the frequencies to be provided by oscillators 23 in each of its 15 different latchable conditions, and by similarly adjusting oscillator 23A. However, once such initial adjustments are made, no further adjustments are required.

In practice for each make of vehicle with a specific axle ratio and wheel size, the system may include a differently set oscillator so that when a coded signal representing a desired speed is received, the oscillator in each vehicle produces an output frequency $f_{ms}$ which corresponds to the frequency $f_r$ which the vehicle would produce when its speed equals the desired speed. This would eliminate the need to adjust each individual system after it is installed in the vehicle. If desired, unit 23 may be made to respond to an external manual setting from a manual input unit 38. Such manual setting would define the maximum desired cruising speed. As will be pointed out hereafter, when a manual external setting is employed, the system would control the maximum speed to be either that defined by the coded signal or the manually set speed whichever is smaller. Similarly, unit 23A accuracy is controlled by the signal derived from transmitter 22A which in turn is controlled by unit 23 in the preceding vehicle.

Thus, all speed frequencies represent actual vehicle speed in miles per hour accurately.

As is appreciated, various presently known devices and techniques may be used and adapted to provide $f_r$ as a function of vehicle actual speed. Likewise $f_{ms}$ may be generated with known devices and techniques to be any one of a plurality of discrete frequencies, e.g., 15, in response to any one of a plurality of received coded signals. As will be pointed out hereafter, digital circuitry is primarily employed to compare $f_r$ and $f_{ms}$ as well as to compare $f_p$ and $f_{of}$; and to provide a voltage output whose amplitude depends on the relationship between the two respective pairs of frequencies. Digital design techniques greatly increase circuit reliability. Once the voltages $V_o$ and $V_c$ are produced, any one of many implementations may be employed to provide a restraining force which is proportional to $V_o$ and $V_c$ to the vehicle's throttle mechanism in opposition to the vehicle operator's foot pressure.

From the foregoing description it should be apparent that the invention differs from the prior art in several very significant aspects. In the prior art, the transmitted maximum speed control signal is the control speed signal and is the same for all vehicles. This requires repeated individual tailoring of the vehicle control circuits, resulting in less reliability, higher cost and greater inaccuracy. Also, the transmitted signal is generally a continuous analog signal, which due to its analog characteristics is subject to normal amplitude changes due to temperature drift, signal strength changes and in addition subject to noise interference. Furthermore, unless very powerful transmitters are used in close proximity signal level changes occur over significant zone distances, thereby affecting the speed control of vehicles, travelling in opposite directions.

Unlike such disadvantages in the present invention, coded signals are transmitted. Due to their coding their reception is substantially immune to amplitude variations and/or the effects of noise. Also, since they need not be transmitted continuously due to the latching properties of unit 23 in the case of control of maximum speeds and limited separation of vehicles in the case of the closing speed limiter, very low power transmitters can be used. The maximum speed control transmitter need only be located at strategic locations such as highway on-ramps and off-ramps or lightly dispersed within specific speed zones to transmit to the vehicle a coded signal only where a change of speed may be required. However, between transmitters, no maximum speed control signal need be received since the maximum speed is defined by the last received coded signal. Similarly, the identical conditions for noise and amplitude immunity apply to the transmitted signals for the closing speed limiter functions with the exception that unit 23A may receive either continuous or aperiodic signals within the zone of influence of the transmitted closing speed signals.

Also, since with the present invention, very low power transmitters utilizing directional codes are required, transmitters controlling the closing speeds of vehicles travelling in opposite directions may be operated without ambiguity.

Units 23 and 23A incorporate a magnetic compass whose outputs define vehicle headings. The coded signals include a heading indication so that each vehicle would respond only to the coded signals for its direction. For example, assuming a highway in a north-south direction, vehicles travelling northward would respond only to coded signals with a northward heading indication, while those travelling southward would respond to the coded signals with a southward heading indication. Such an arrangement would insure failproof separate speed control for vehicles travelling in opposite directions as well as effective closing speed control for pairs of vehicles as previously defined with regard to direction, lane of traffic and zone of influence.

In accordance with the present invention digital rather than analog techniques and devices are employed wherever possible to minimize the system's sensitivity to voltage level and waveform changes. Herein, the speed comparisons are based on comparing frequencies which in essence represents pulse counting, a highly accurate and stable method, which can be implemented with present day integrated circuitry to save space and cost.

Figure 2:
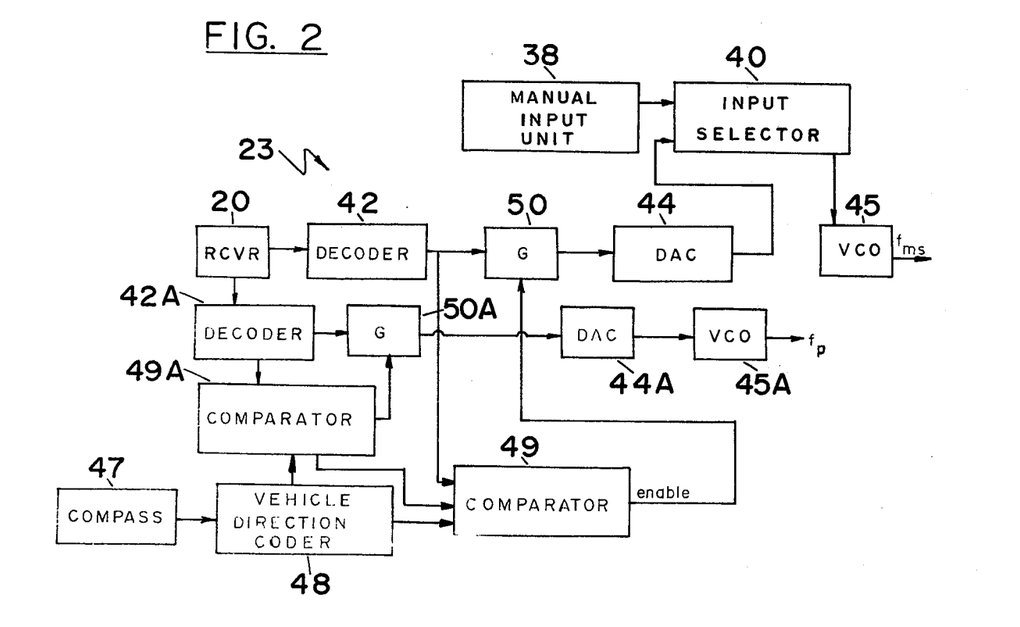
FIGS. 2, 3, 3A and 4 are block diagrams of various sub-systems shown in FIG. 1.

Attention is now directed to FIG. 2 which is primarily a block diagram of but one possible implementation of the unit 23, needed to provide $f_{ms}$, and $f_p$ as a function of received coded signals. As previously stated, the receiver outputs which are the received coded signals are decoded by decoders 42 and 42A; and the signal codes which are in digital form activate digital-to-analog (D/A) converters 44 and 44A, whose outputs are assumed to be two separate and distinct voltages. The amplitudes of the output voltages of the converters are directly related to the codes of the received signals. These are supplied to oscillators 45 and 45A which are assumed to be voltage controlled oscillators or VCO's, through an input selector 46 in the case of VCO 45 to provide $f_{ms}$ and directly to VCO 45A to provide $f_p$.

In operation when unit 38 is not set, selector 40 supplies oscillator 45 with the output of converter 44. However, when unit 38 is set, selector 40 supplies oscillator 45 with either the output of unit 38 or converter 44, whichever is smaller. This enables the system to define the maximum speed as that set manually as long as it does not exceed the speed defined by the coded signal. For example, assuming that the received speed is 50 mph, the operator may set the speed to be less than 50 mph. If however, he sets the speed for more than 50 mph, the received speed as defined by the output of converter 44 will be used for speed control. By selecting the converter 44 to include digital stages, such as flip-flops, which are clocked by the output of receiver 20 whenever a new coded signal is received, the converter's output will change only when a new coded signal is received, but will remain constant between the reception of two successive coded signals. Thus, the latching feature of unit 42 is achieved.

Units 42A, 50A, 44A, and 45A are essentially identical to units 42, 50, 44, and 45 except that unit 42A does not employ the latching function, and are not effected in any way by unit 38. The output of decoder 42A represents the actual speed of the preceding vehicle and gate 50A is opened when comparator 49A is in the proper state, i.e., when the direction codes of the closing vehicles are the same.

Unit 23 includes a compass 47 to indicate vehicle direction, its output activates a coder 48 which provides a code indicating vehicle direction. In such an arrangement the received coded signals outputed by decoders 42 and 42A includes codes of direction in which traffic is to be controlled by the coded signals respectively with regard to maximum speed and closing speed limiting. The decoders 42 and 42A supply the received direction codes to comparators 49 and 49A to which the vehicle direction code from coder 48 is also supplied. When the two codes are the same, comparators 49 and 49A enables gates 50 and 50A as applicable to enable the received speed code from decoder 42 to be supplied to converter 44 and also the identical speed code representing the preceding vehicle speed to be supplied to converter 44A. Thus, in this embodiment the converters respond only to received coded signals which are designed to control maximum speed and closing speed in the direction in which the vehicles travel.

Figure 3:
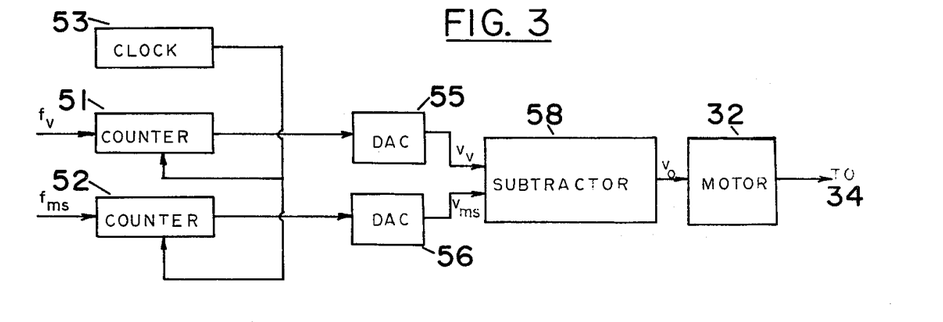
Figure 3A:
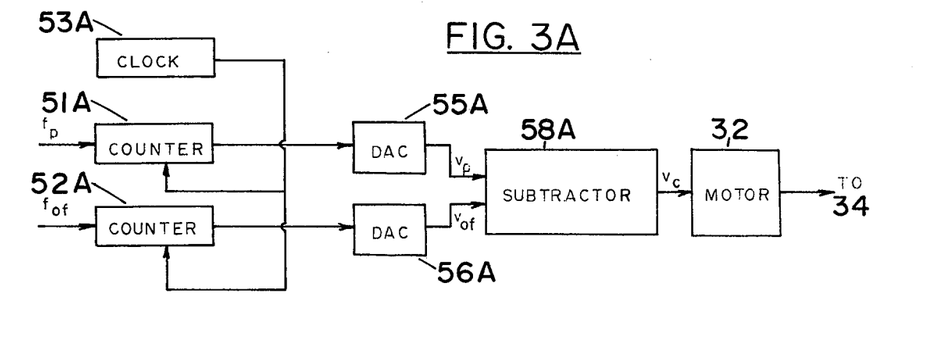
Figure 4:
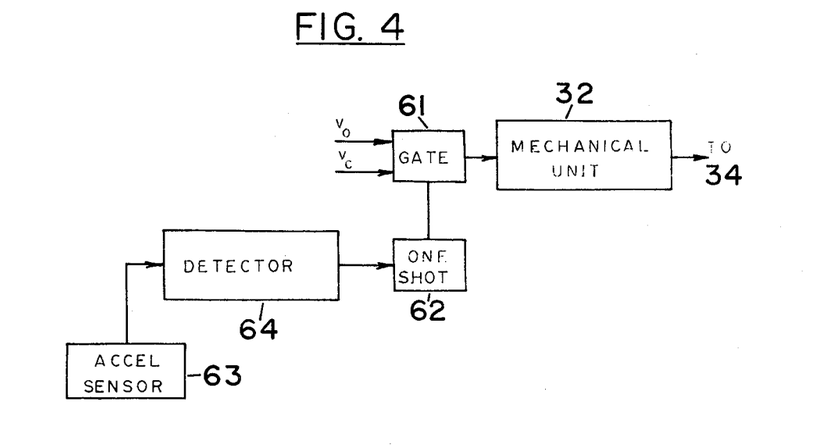

As is appreciated by those familiar with circuit design, various known devices may be used to implement the frequency comparators 30 and 30Aa which, as previously described, are intended to provide an output voltage, $V_o$, which is zero when $f_r \leq f_{ms}$ and one whose amplitude is directly related to $f_r - f_{ms}$ when $f_r > f_{ms}$ in the case of comparator 30; and an output voltage, $V_c$, which is zero when $f_{of} \leq f_p$ and one whose amplitude is directly related to $f_{of} - f_p$ when $f_{of} > f_p$ in the case of comparator 30A.

Thus, the following description in conjunction with FIG. 3 should be regarded as only one possible implementation and is not intended to limit the invention thereto.

As shown in FIG. 3, the comparator 30 comprises a pair of counters 51 and 52 to which $f_r$ and $f_{ms}$ are supplied, respectively. The two counters are resettable by the output of a clock 53, which defines a pulse-counting period for the two counters. The respective outputs of counters 51 and 52 are supplied to D/A converters 55 and 56. Thus, the output of converter 55 is an analog signal, such as a voltage, related to $f_r$, while the voltage output of converter 56 is related to $f_{ms}$. The pulse counting or measuring period, as defined by clock 53, is chosen as a function of the expected maximum frequncies, the bit length or maximum count of the two counters, and the desired accuracy so that during each counting period, the output of converters 55 and 56, designated $V_r$ and $V_{ms}$ truly represent $f_r$ and $f_{ms}$, respectively.

The outputs $V_r$ and $V_{ms}$ are supplied to a subtractor 58 which subtracts $V_{ms}$ from $V_r$ and provides an output $V_o$ which is a function of this difference. $V_o = 0$ when $V_r \leq V_{ms}$. However, $V_o > 0$ when $V_r > V_{ms}$, i.e., when the vehicle speed is greater than the desired maximum speed.

Similarly, as also shown in FIG. 3A, the comparator 30A comprises a pair of counters 51A and 52A to which $f_p$ and $f_{of}$ are supplied, respectively. The two counters are resettable by the output of clock 53A which defines a pulse counting period for the two counters. The respective outputs of counters 51A and 52A are supplied to D/A converters 55A and 56A. Thus, the output of converter 55A is an analog signal, such as a voltage, related to $f_p$ which in turn is identical to $f_r$ for the preceding vehicle, while the voltage output of converter 56A is related to $f_{of}$, which in turn is identical to $f_r$ for the on-following vehicle. The pulse counting or measuring period, as defined by clock 53A is chosen as a function of the expected maximum frequencies, the bit length or maximum count of the two converters, and the desired accuracy so that during each counting period, the outputs of converters 55A and 56A, designated $V_p$ and $V_{of}$ truly represent $f_p$ and $f_{of}$, respectively.

The outputs $V_p$ and $V_{of}$ are supplied to a subtractor 58A which subtracts $V_p$ from $V_{of}$ and provides an output $V_c$ which is a function of this difference. $V_c = 0$ when $V_{of} \leq V_p$. However, $V_c > 0$ when $V_{of} > V_p$, i.e., when the on-following vehicle speed is greater than the preceding vehicle speed and when the on-following vehicle is in the zone of influence of the transmitted signal from the preceding vehicle as previously described for a closing speed situation.

In FIG. 1 $V_o$ and $V_c$ are shown supplied to the mechanical unit 32. The latter may assume the form of a unidirectional motor, as opposed to a reversible, motor which provides a torque, and therefore the restraining force which is applied to the mechanism 34. The restraining force is proportional to either $V_o$ or $V_c$ whichever is greater.

From the foregoing it should be appreciated that in accordance with the invention both the vehicle speed and the desired maximum speed, which is tranmitted to the system as a coded signal are converted into respective frequencies. Digital counters determine these frequencies by counting them during each counting period. Only when the vehicle speed exceeds the maximum desired speed is a voltage generated, whose amplitude is related to the speed by which the vehicle speed exceeds the maximum speed. This voltage is converted into a restraining force applied to the vehicle's throttle mechanism in opposition to the operator's foot pressure, thereby making the operator immediately aware of the excessive speed and also slowing the vehicle to the desired speed.

And also from the foregoing, it should be further appreciated that in accordance with the present invention the respective speeds of vehicles when in closing speed situation as previously defined are generated and transmitted into the circuitry of the system as coded signals converted into their respective speed frequencies. Digital counters also determine these frequencies by counting them during each counting period. Only when the on-following vehicle speed exceeds the preceding vehicle speed when said vehicles are traveling in the same direction, in substantially the same lane of traffic, and within a predetermined zone of influence is a voltage generated, whose amplitude is related to the closing speed by which the on-following vehicle speed exceeds the preceding vehicle speed.

This voltage, $V_c$, is converted into a restraining force applied to the on-following vehicle's throttle mechanism in opposition to the vehicle operators foot pressure, thereby immediately slowing the vehicle and making the operator immediately aware of the excessive closing speed.

In practice, the system may further include means to enable the operator to override the control for a preselected period of time at the end of which the control, i.e., the restraining force is again applied. Such override would be desirable whenever rapid acceleration is needed, such as in passing another vehicle or in case of a sudden emergency in which it is desired to move the vehicle from a danger area as fast as possible.

Such override may be provided by supplying $V_o$ or $V_c$ from comparators 30 and 30A respectively to mechanical unit 32 through a gate 61 (see FIG. 4) which is open except when closed by a disabling signal from a one shot 62. The system may further include an acceleration sensor 63 which senses sudden changes in vehicle acceleration. The output of sensor 63 is supplied to a threshold detector 64 which supplies a trigger pulse to the one-shot 62 whenever the acceleration exceeds a selected value. When the one-shot is triggered, it provides a disabling signal to gate 61, the duration of the signal being a function of the one-shot pulse duration. Thus, during such a period gate 61 is closed thereby inactivating unit 32 which in turn reduces the restraining force to zero.

The override function is operable for both maximum speed control and cruise control and in addition for closing speed limiting as the need for rapid acceleration and the ability to pass another vehicle is common to these modes of speed control.

As will be appreciated by those skilled in the art, those components and circuits of the present invention which perform essentially similar and/or identical functions can be integrated into composite units rather than separate units which have been described herein mostly for purposes of clarity. It shoudl also be appreciated that some duplication of identical units increase reliability and as a consequence either arrangement may be utilized.

Figure 5:
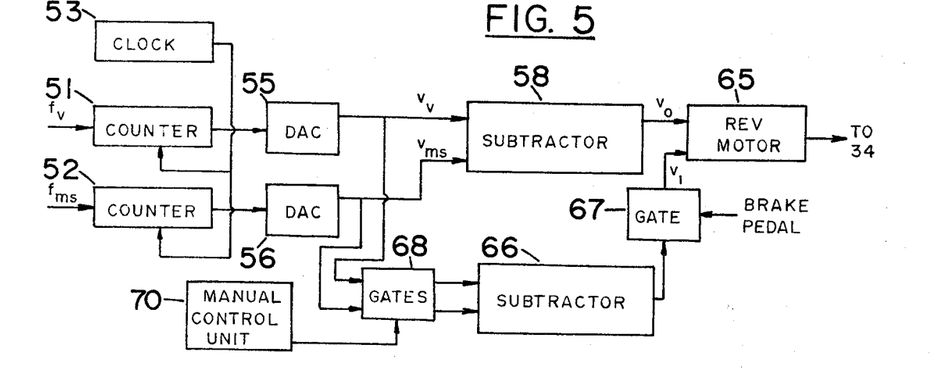
FIG. 5 is a partial block diagram of another embodiment of the invention.

The basic teachings of the invention may be easily extended to provide a novel cruise control system. Such a system can be used to maintain the vehicle at a constant speed which may either be selected manually or transmitted to the vehicle. In such a sytem all the parts of system 10 shown in the foregoing figures are included. However, as shown in FIG. 5, the mechanical unit 32 comprises a reversible motor 65, to which the output $V_o$ of subtractor 58 is applied. Also, the motor is supplied with a second input which is the output of subtractor 66, designated $V_1$ through a gate 67. Subtractor 66 which is supplied with $V_r$ and $V_{ms}$ from converters 55 and 56, subtracts $V_r$ from $V_{ms}$. $V_1 = 0$ whenever $V_{ms} \leq V_r$. However, when $V_{ms} > V_r$, the amplitude of $V_1$ is directly related to the speed by which $V_{ms}$ exceeds $V_r$.

It should thus be apparent that at any time either $V_o$ or $V_1$ is zero, except when $V_r = V_{ms}$ in which case both $V_r$ and $V_1$ are zero. Whenever $V_{ms}$ is greater than $V_r$, i.e., the vehicle speed is less than the cruise speed $V_1$ activates the motor 65 to turn in a first direction to apply a force to the throttle mechanism which activates it in the same direction as an operator's foot pressure to thereby increase the vehicle speed to the cruise speed. However, when $V_r > V_{ms}$, $V_1$ is zero and $V_o$ causes the reversible motor to turn in a second direction opposite the first direction. As a result, a restraining force is applied to the throttle mechanism in a direction opposite the direction in which an operator's foot pressure would be applied. Consequently, the vehicle speed is reduced. Gate 67 is incorporated between subtractor 66 and motor 65. Gate 67 is closed when the brake pedal is activated. This is done to prevent the vehicle speed from increasing whenever the opposite performance is desired, i.e., vehicle slow down. If desired, once gate 67 is closed it can be made to remain closed for a selected time period before full cruise control is again resumed.

As previously stated, the desired cruising speed may be transmitted to the system and received by the receiver to control $f_{ms}$ as previously described in conjunction with the speed control embodiment. Similarly, the desired cruising speed may be set manually by unit 38 (FIG. 2). If desired $V_r$ and $V_{ms}$ may be supplied to subtractor 66 through mode control gates 68 (FIG. 5) which are assumed to be controlled by a manual control unit 70. For the speed control mode, unit 70 disables or closes gates 68 to disable subtractor 66 thereby causing the system to perform the speed control function. On the other hand, when gates 68 are opened by unit 70, the system is in the cruise control mode.

It should be stressed that the cruise control system of the invention is unlike any prior art system. In the prior art systems the vehicle speed must be brought up to desired cruise speed before the cruise control system takes over automatic control. In the invention the cruise speed control starts even when the vehicle is not in motion, i.e., when both $f_r$ and $V_r$ are zero, since the system is capable of raising the vehicle speed to the desired cruise speed as well as reduce its speed whenever vehicle speed exceeds the cruise speed.

Furthermore, in the invention, the maximum cruise speed can be changed by the coded signals. This would enable traffic officials to increase or decrease vehicular velocity for optimum traffic flow. It should be stressed that in the cruise mode, the cruise speed is either that defined by the coded signals or by the manually set speed, if the latter is less than that defined by the coded signals. Also, at any instant the cruise mode is interruptable by the brake pedal. In addition, if desired, the gates 68 may be controlled by specially coded signals received by receiver 20. This would enable traffic officials to institute the cruise control mode remotely. Yet individual drivers may individually interrupt this mode by touching the brake pedals of their vehicles. Such a system would greatly facilitate high density traffic movement and its control.

Figure 6:
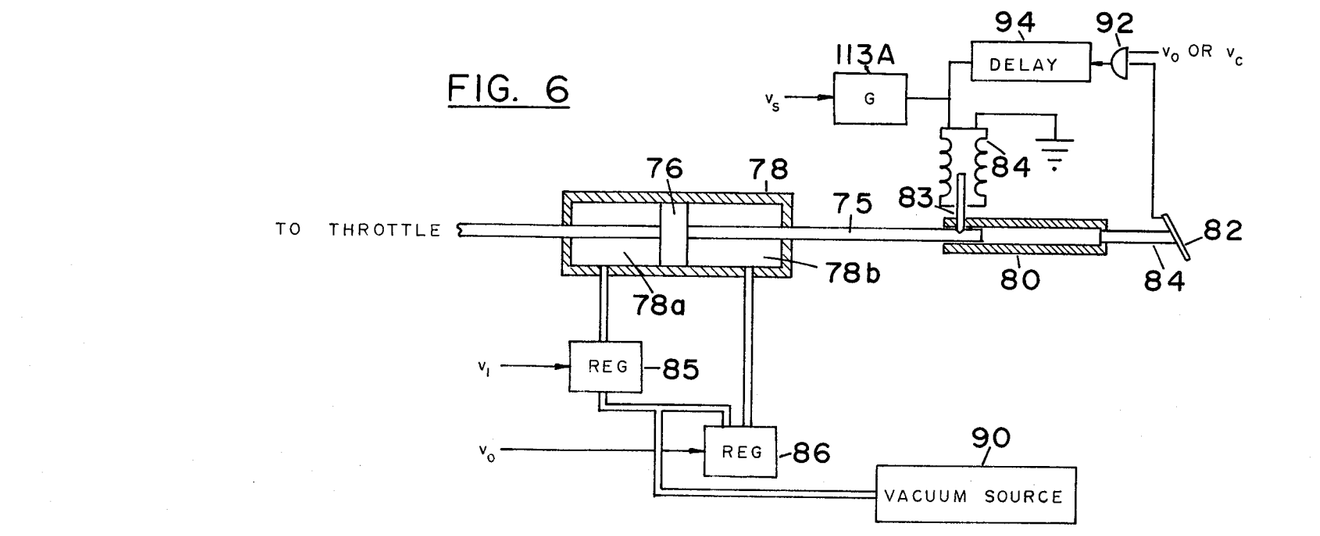
FIGS. 6 and 7 are schematic diagrams which are useful in explaining specific embodiments of the invention with regard to speed controls, closing speed and performance monitoring functions of circuitry shown in FIG. 1.

Attention is now directed to FIG. 6 which represents another embodiment for controlling throttle linkage movement and thereby vehicle speed in response to $V_o$, $V_1$ and $V_c$. In this embodiment numeral 75 designates a throttle linkage which is coupled to a piston 76 in a vacuum chamber 78. The linkage 75 is assumed to be connected at its left end to the vehicle throttle so that when the linkage moves to the left, vehicle speed is increased, and is decreased when the linkage 75 moves to the right. At the right end the linkage extends into a hollow tube-like member 80 which is also connected to the vehicle's gas or accelerator foot pedal 82 through an arm 84. The linkage 75 is locked to member 80 by means of a spring loaded piston 83 of a solenoid 84.

Basically, the piston 76 divides chamber 78 into two vacuum chambers 78a and 78b which are connected through regulators 85 and 86 to a vacuum source 90. In response to $V_o$ which occurs when $V_r > V_{ms}$, regulator 86 is opened thereby connecting chamber 78b to the vacuum source 90, so that the linkage is pulled to the right. A similar situation exists in response to $V_c$ which occurs when $V_{of} > V_p$. On the other hand, in the cruise control mode, in response to $V_1$ which occurs when $V_{ms} > V_r$, regulator 85 is opened so that the linkage 75 is pulled to the left thereby increasing vehicle speed. To provide fast system override, such is desired to bypass a vehicle or in case of an emergency, yet limit the override duration an AND gate 92 is provided. It activates a time delay unit 94 only when $V_o$ and/or $V_c$ are present, i.e., $V_r > V_{ms}$ or $V_{of} > V_p$ and the gas foot pedal is pushed down by the operator. After a period defined by the delay unit 94, the solenoid is activated, pulling piston 82 and thereby breaking the connection between linkage 75 and member 80. Consequently, any further operator force on the foot pedal would not affect the position of the linkage 75 since such force would merely cause member 80 to slide over linkage 75. Means may be provided to deenergize solenoid 84 and thereby reconnect linkage 75 to member 80 after a second time period and/or after the brake pedal is pressed and once again $V_r \leq V_{ms}$ or $V_{of} \leq V_p$.

Figure 7:
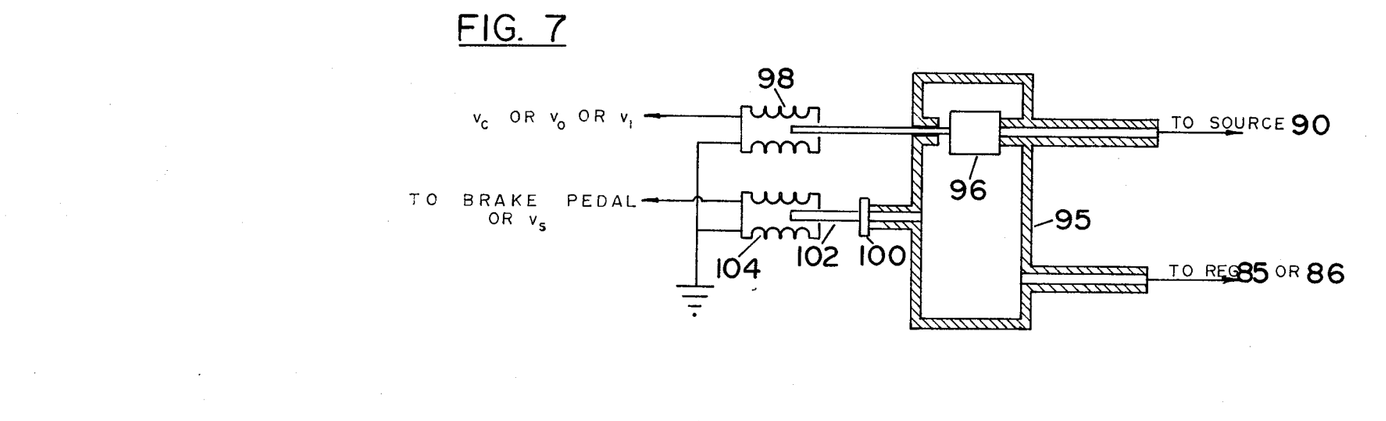

Attention is now directed to FIG. 7 which is one example of either regulator 85 or 86. It comprises a chamber 95 and a piston 96 which provides communication between source 90 and one of the subchambers of 78 when an appropriate signal ($V_o$, $V_1$ or $V_c$) is applied to a solenoid 98. Chamber 95 is provided with a vent port 100 which is opened by a piston 102 when a solenoid 104 is energized whenever the brake pedal is pushed. Thus, the operator when pushing on the brake pedal vents both subchambers of chamber 78 thereby disengaging the system from controlling vehicle speed.

Although particular embodiments of the invention have been described and illustrated herein, it is recognized that modifications and variations may readily occur to those skilled in the art. For example, the control of the position of linkage 75 may be provided by connecting it to two sealed diaphragms which are in turn connected to source 90 through regulators 85 and 86. One diaphragm would pull the linkage to the left when $V_{ms} > V_r$ and the other diaphragm would pull it to the right when $V_r > V_{ms}$ or $V_{of} > V_p$. Also hydraulic means may be provided to couple and decouple linkage 75 to and from member 80. Consequently it is intended that the claims be interpreted to cover such modifications and equivalents.

Figure 8:
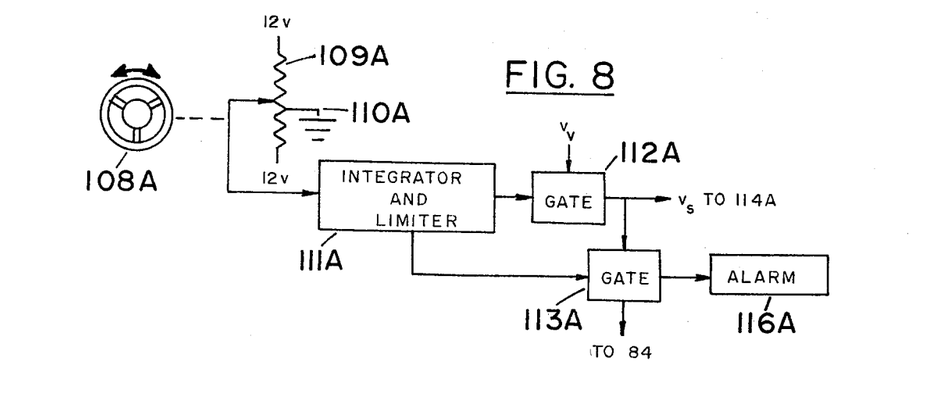
FIG. 8 is a block diagram of the vehicle performance monitor.

Attention is now invited to FIG. 8 which is but one example of a vehicle steering performance monitor. Sensor 109A, which may be a multi-turn potentiometer, generates an output which is analog in form and whose magnitude is a function of the degree of angular rotation away from the zero or null point 110A. The null point corresponds to the conditon when the steering wheels of a vehicle operable by an operator are straight ahead.

The output voltage of steering angle sensor 109A which represents the instantaneous steering angle deviation from the null point is conditioned by an integrator and limiter unit 111A. The output of unit 111A is a voltage, $V_s$, corresponding to the time integral of the degree of turning angle and the rate of change of turning of the vehicle. Said output which is designated as $V_s$ is directed to speed threshold gate 112A which is closed when $V_r$ is less than a predetermined low value such as 5 mph to allow for high turning angles and rates of change when parking or other slow speed maneuvering is required. Similarly, above a predetermined steering deviation and angular rate of change, steering threshold gate 113A is opened and the output integrator-limiter 111A is passed to the throttle deactivator mechanism (FIG. 6), thereby energizing solenoid 84 and thus causing pin 83 to decouple linkage 75 and member 80; and at the same time sounding an alarm which alerts the operator to the fact that he no longer has control of the throttle mechanism.

The consequence of the above recited series of events is that the vehicle speed is immediately reduced to a minimun speed equivalent to engine idle speed. This embodiment of the invention is effective to remove control of the vehicle accelerator from the vehicle operator in the event said operator is either intoxicated, ill, or otherwise unable to control the steering of the vehicle as a consequence of vehicle malfunction or any other condition which prohibits proper steering control.

Figure 9:
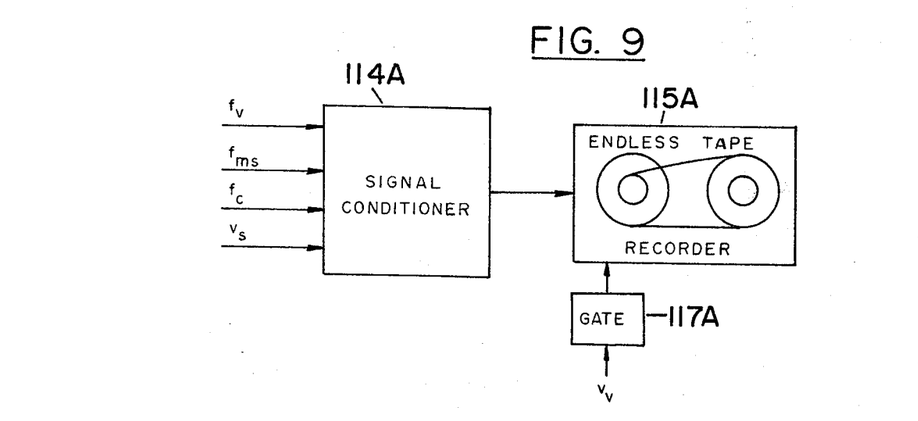
FIG. 9 is a block diagram of the vehicle speed, vehicle closing speed limiter and performance monitoring system recorder.

Attention is now directed to FIG. 9 which shows how the vehicle performance parameters; $f_r$ (actual vehicle speed); $f_{ms}$ (maximum commanded vehicle speed); $f_c$ (vehicle closing speed) and $V_s$ (steering error output); are conditioned by signal conditioner 114A and applied to an endless record magnetic recording device to provide a time limited continuous record of the above recited vehicle performance parameters. Speed threshold gate 117A controls the start and stop of recorder 115A.

Although particular embodiments of the present invention have been described and illustrated herein, it is recognized that modifications and variations may readily occur to those skilled in the art, and consequently it is further intended that the claims be interpreted to cover such modifications and equivalents.

What is claimed is:

1. A system for controlling the closing speed between two vehicles traveling in the same direction and substantially in the same lane of traffic, the system comprising:

first means coupled in each of said vehicles for generating a first sequence of pulses at frequencies which are directly related to each vehicles own speed, respectively:

direction means in each vehicle for determining the direction of travel or heading of each vehicle, with further means for converting said direction of travel or heading of each vehicle to a discrete digital code, transmitting means coupled in each vehicle for transmitting rearward from said vehicles a continuous electromagnetic energy beam including modulation means to transmit digitally coded signals which represent the vehicle's own speed and own direction, further means coupled in each vehicle for limiting the zone of influence of said transmitted coded signals to a predetermined distance and angular beam width extending rearward from said vehicles so as to establish a predetermined and limited zone of influence with respect to vehicles following in train behind the transmitting vehicle, receiving means coupled in each vehicle for receiving said coded transmitted signals, said coded signals representing the speed and direction of the vehicle in front of the receiving vehicle, when the receiving vehicle is within said zone of influence and substantially in the same lane of traffic with the vehicle in front, second means in each vehicle coupled to said receiving means for decoding said speed and direction signals received from said transmitting vehicle to provide a first output which is frequency related to the speed of said transmitting vehicle and a second output which is digitally coded to represent the direction of travel or heading of said transmitting vehicle when said receiving vehicle is within the said zone of influence of said transmitting vehicle, third means in each vehicle coupled to said first means to provide a third output which is frequency related to said receiving vehicle's own speed and a fourth output coupled to said direction means which is digitally coded to represent the direction of travel or heading of said receiving vehicle, fourth means in each vehicle coupled to said third means for digitally determining the frequency difference between said first output and said third output when the said second output and said fourth output are substantially the same, fifth means in each vehicle coupled to said fourth means to provide a fifth output when the frequency of said third output exceeds or is greater than the frequency of said first output providing said second output and said fourth outputs are substantially the same, sixth means coupled in each vehicle for providing a first force proportional to said fifth output.

2. The arrangement as recited in claim 1 wherein the vehicle is of the type operable by an operator and including a throttle mechanism to which an operator-produced force is appliable to control vehicle speed, said system including means for applying the said first force produced by said sixth means to said throttle mechanism in a direction which is opposite to the direction in which the operator-produced force is appliable.

3. The arrangement as recited in claim 1 wherein said receiving means include means for receiving aperiodically any one of a plurality of said coded signals, said coded signals representing said transmitting vehicle variable speeds and variable direction of travel or heading of said transmitting vehicle.

4. The arrangement as recited in claim 1 wherein said second means includes gating means for disabling said fourth means and thus said fifth output in the event that the receiving vehicle is not within the zone of influence of said transmitting vehicle.

5. The arrangement as recited in claim 2 wherein the vehicle is of a type operable by an operator including means for the receiving vehicle operator to over-ride said first force produced by said sixth means to said throttle mechanism to provide vehicle passing or overtaking of said transmitting vehicle at the option of the receiving vehicle operator.

6. The arrangement as recited in claim 1 wherein each received coded signal includes a first direction code defining the direction in which said transmitting vehicle is heading, whether in motion or not, said system further including means for providing a second direction code defining the receiving vehicle heading, whether in motion or not, including direction code comparison means for controlling said fifth means to supply said fifth output only when said first and second direction codes are substantially the same.

7. The arrangement as recited in claim 1 further including gating means coupled to said fourth means and said fifth means for selectively inhibiting the supply of said first force to said throttle mechanism when the frequency of the first output is equal to or greater than the frequency of the third output.

8. The arrangement as recited in claim 2 wherein the vehicle is of the type operable by an operator further including gating means for disabling said first force produced by said sixth means when the receiving vehicle departs said zone of influence of the transmitting vehicle by operator induced vehicle speed reduction such that said third output is equal to or less than said first output.

9. The arrangement as recited in claim 8 wherein the vehicle is of a type operable by an operator including gating means for disabling said first force produced by said sixth means when said receiving vehicle departs said transmitting vehicle's said zone of influence by said operator election to change lanes of traffic.

* * * * *